United States Patent [19]
Rayner et al.

[11] 3,782,545
[45] Jan. 1, 1974

[54] SEED RECLAIMING DEVICE

[76] Inventors: Roy Allen Rayner, 492 Rita St.; Harold Waldemar Sandberg, 421 N. Algoma St., both of Thunder Bay, Ontario, Canada

[22] Filed: May 15, 1972

[21] Appl. No.: 253,619

[52] U.S. Cl. .............................................. 209/114
[51] Int. Cl. ............................................... B07c 9/00
[58] Field of Search ......................... 209/114, 119; 198/192

[56] References Cited
UNITED STATES PATENTS

| 788,839 | 5/1905 | McDonald | 209/114 |
| 3,294,218 | 12/1966 | Chantland | 198/192 |

*Primary Examiner*—Allen N. Knowles
*Assistant Examiner*—Gene A. Church
*Attorney*—Stanley G. Ade

[57] ABSTRACT

An inclined belt is shaped on the upper run by side rollers to form a slight trough. By-products resulting from initial seed cleaning are dropped from a hopper onto the belt just above the lower end. Heavy round seeds such as rape-seeds bounce and pass over the lower end while light seeds and flat seeds and other contaminants pass over the upper or head end. The fraction that passes over the lower or tail end drops onto a further inclined belt underneath the first belt and at a slightly flatter angle and the process is repeated but giving a basic separation of heavy rape-seed over the lower end and light rape-seed and mustard seed over the upper end both of which fractions can be used commercially.

1 Claim, 5 Drawing Figures

3,782,545

PATENTED JAN 1 1974

SEED RECLAIMING DEVICE

BACKGROUND OF THE INVENTION

In the initial seed cleaning of seeds such as rape-seed or the like, a considerable quantity of rape-seed ends up as by-products together with broken seed, mustard seed, linseed or the like. Also present is other contaminants all of which make the by-products fit only for animal feed. They therefore command a relatively low price.

However contained in such by-products is a fairly large quantity of rape-seed and as rape-seed is a high cost seed, it will be appreciated that the presence of such rape-seed in the by-products is extremely wasteful and expensive.

SUMMARY OF THE INVENTION

The present invention is designed primarily to recover rape-seed from by-products resulting from initial cleaning processes.

The principal object and essence of the invention is therefore to provide a device of the character herewithin described which will recover heavy round seeds such as rape, mustard or the like from contaminants which may include mustard seed, linseed and other such seeds which are oval and flat.

A further object of the invention is to provide a device of the character herewithin described which includes a pair of inclined belts one above the other, the first belt initiating the primary separation of heavy and light rape-seed and mustard seed from the remainder of the by-products, the second belt being designed to separate heavy rape-seed from light rape-seed and mustard seed both fractions of which can be used commercially and command relatively high prices.

Another object of the invention is to provide a device of the character herewithin described which utilizes a feed hopper for the upper run of the upper belt which drops the mass of by-product upon the belt after a free fall so that the relatively heavy seeds bounce and are thus separated and pass over the lower or tail end of the belt. A still further object of the invention is to provide a device of the character herewithin described in which the angle of inclination of the belts can be adjusted within limits to achieve maximum separation.

A still further object of the invention is to provide a device of the character herewithin described which enables the recovery of relatively high priced rape-seed to be undertaken readily and easily.

A still further object of the invention is to provide a device of the character herewithin described which is simple in construction, economical in manufacture, and otherwise well suited to the purpose for which it is designed.

With the foregoing objects in view, and such other or further purposes, advantages or novel features as may become apparent from consideration of this disclosure and specification, the present invention consists of the inventive concept which is comprised, embodied, embraced, or included in the means, method, process, product, construction, composition, arrangement of parts, or new use of any of the foregoing, herein exemplified in one or more specific embodiments of such concept, reference being had to the accompanying drawings in which:

BRIEF DESCRIPTION OF THE DRAWINGS

In the drawings like characters of reference indicate corresponding parts in the different figures.

DETAILED DESCRIPTION

Figure 1:
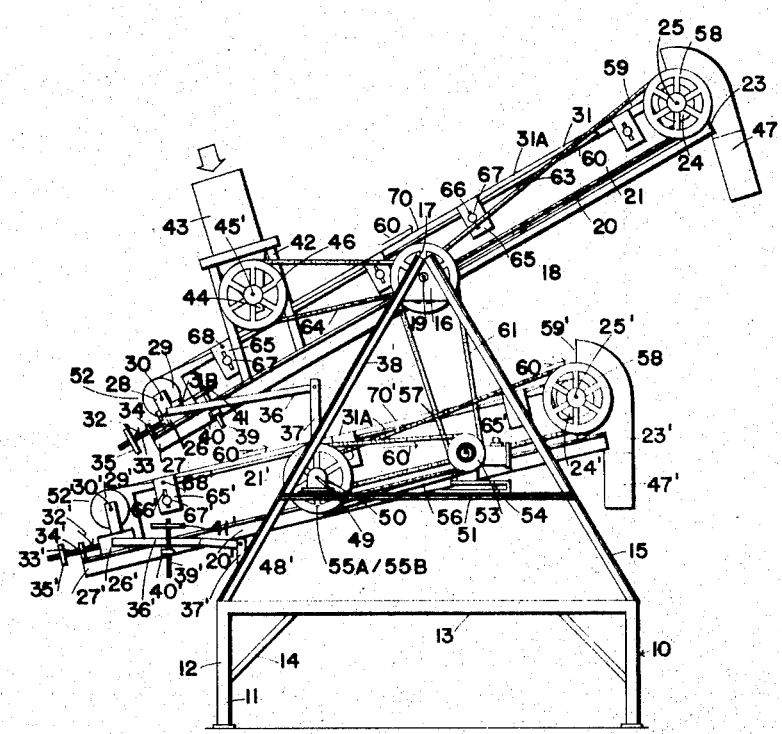
FIG. 1 is a side elevation of the device.
Figure 3:
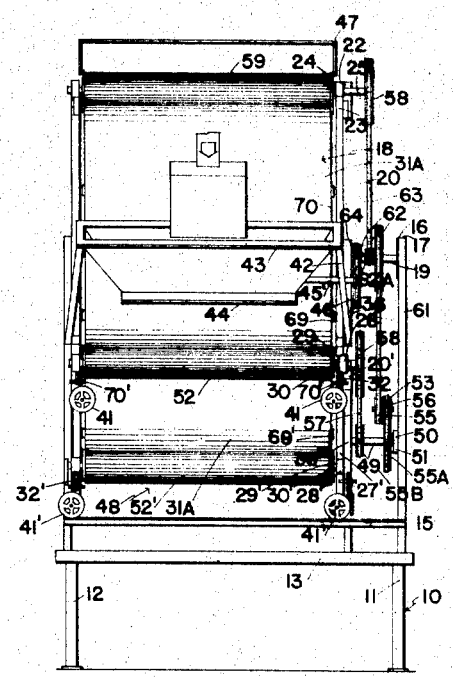
FIG. 3 is a top plan view of FIG. 1.
Figure 2:
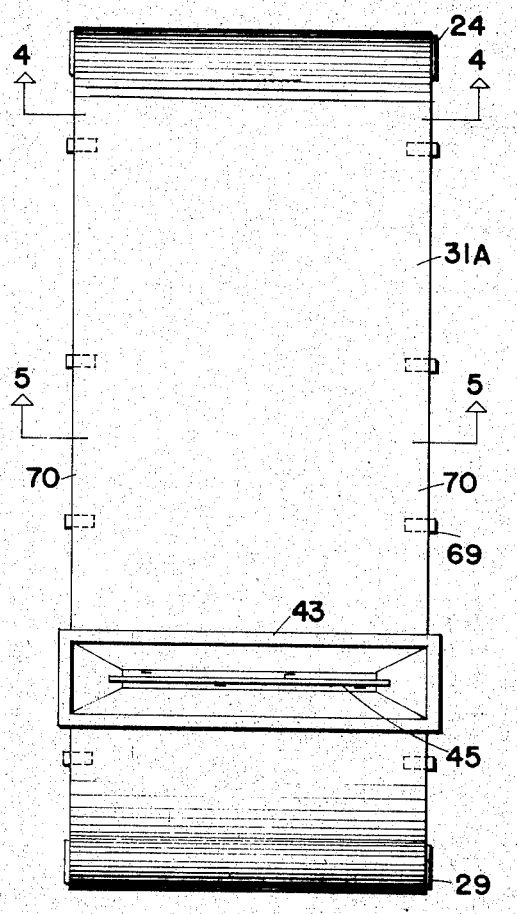
FIG. 2 is a top plan view of the upper belt and hopper assembly.
Figure 4:
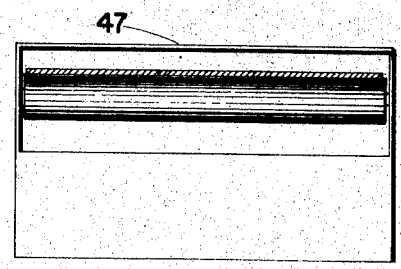
FIG. 4 is a section along the line 4—4 of FIG. 2.

Proceeding therefore to describe the invention in detail, reference character 10 illustrates generally a supporting structure consisting of a substantially rectangular base frame 11 including uprights 12, cross members 13 and diagonal braces 14.

A pair of A frames 15 extend upwardly from the base 11 terminating with a gusset plate 16 at the apex thereof, said apex being identified by reference character 17.

A primary endless belt assembly collectively designated 18 is mounted between the gusset plate 16 of the two spaced and parallel A frames 15, by means of bearing spindles 19 extending outwardly from each side of the assembly 18 and engaging through the gusset plates 19.

The assembly 18 consists of an elongated substantially rectangular frame 20 having metal side plates 21 extending upwardly upon each side thereof.

A pair of bearings 22 are mounted at the upper ends 23 of the framework 20 and a roller 24 is journalled within the bearings 22 by means of spindle 25 extending from the ends of the roller.

Movable bearing assemblies 26 are mounted for limited endwise movement upon the lower end 27 of the frame 20 and these assemblies include bearings 28 having a roller 29 journalled for rotation between the bearings by means of spindles 30 extending outwardly from the ends of the roller 29.

An endless belt 31 extends around rollers 24 and 29, said endless belt having an upper run specifically designated 31A and a lower run specifically designated 31B.

Belt tightening adjustors 32 consist of screw threaded rods 33 engageable within a screw threaded bracket 34 upstanding from the lower end 27 of the frame. A hand wheel 35 secured to the end of the spindle 33 enables the spindle to be moved inwardly and outwardly relative to the end 27. The inner end of the spindle 33 is engaged within the bearing assembly 26 and can rotate therein but cannot move endwise relative thereto so that movement of the spindle moves the bearing assembly 26 longitudinally relative to the frame 20 thus loosening or tightening belt 31.

Side support members 36 are pivoted to upstanding members 37 which in turn are supported upon one leg 38 of the A frames 15 and a bracket (not illustrated) extends inwardly from the member 36 and receives for rotation a screw threaded rod 39 which screw threadably engages a block 40 secured to one of the side frame members 20 of the assembly 18. A hand wheel 41 permits rotation of the screw threaded rod 39 so that rotation thereof adjusts the angle of inclination of the primary endless belt assembly 18 around the spindles 19.

A supporting frame 42 extends upwardly from the side frame members 20 of the assembly 18 and a hopper 43 is supported in the framework 42 and extends transversely across the upper run 31A of the belt 31. This hopper is provided with a transverse discharge 44 at the base thereof extending across the upper run 31A and spaced above the upper run so that material passing from the discharge has a free drop upon the upper run of the belt 31 as will hereinafter be described.

An agitator rod 45 is journalled within the base of the hopper with spindle 45' extending therefrom and a belt pulley 46 is secured to this spindle 45' for rotating the agitator as will hereinafter be described. A collecting hood 47 is situated adjacent the upper end 23 of the framework 20 and is fitted around the portion of the belt extending around roller 24 so that any material moving upwardly upon the upper run 31A of the belt will be deposited within the collector hood 47.

Situated also within the A frame assemblies 15 is a secondary endless belt assembly collectively designated 48 being supported therein by means of a transverse spindle 49 extending from the assembly and engaging within bearing blocks 50 supported upon the cross member 51 of the A frames 15 as clearly shown in FIG. 1.

The construction of the assembly 48 is similar to the construction of the assembly 18 so that similar reference characters have been given to the various parts with the exception that the numbers have been primed.

Once again it will be observed that the angle of inclination of this assembly 48 can be controlled in a similar manner to the angle of inclination of the assembly 18.

Of importance is the fact that the lower end 52' of the assembly 48 extends forwardly of the lower end 52 of the assembly 18 and that assembly 48 is situated immediately below assembly 18.

A source of power taking the form of an electric motor 53 is mounted upon support 54 within the supporting structure 15 and a belt pulley 55 is secured to the shaft 56 of this motor. A double pulley 55A/55B is journalled for rotation upon shaft 49 and a belt 56 extends around pulley 55 and around the portion 55A of the double pulley. A further belt 57 extends around the portion 55B of the double pulley and around a pulley 58 journalled for rotation upon the spindle 25' situated at the upper or head end 59' of the lower assembly 48. The motor 53 drives belt 56 in the direction of arrow 60 so that the upper run 31A' of the lower assembly 48 moves upwardly from the lower end 52' toward the upper end 59'.

A drive belt 61 extends around a further pulley secured to the shaft of the motor 53 and around a pulley portion 62 journalled upon shaft 19 in the upper assembly 18.

A further pulley portion 62A is provided upon shaft 19 and belt 63 extends around this pulley and around a pulley 58 secured to shaft 25 at the head end 59 of the primary assembly 18.

A further belt 64 extends around a further pulley portion 62B on shaft 19 and around the aforementioned pulley 46 to rotate the agitator 45 within the hopper 43.

The location of the pulley and belts also ensures that the upper run 31A of the upper assembly 18 also moves from the lower end 52 towards the upper or head end 59.

Figure 5:
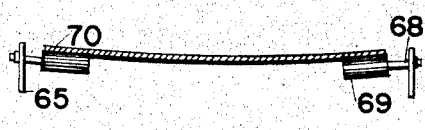
FIG. 5 is a section along the line 5—5 of FIG. 2.

Means are provided to raise the edges of the upper runs 31A and 31A' so that they are of a trough-like formation as shown in FIG. 5, said means taking the form of plates 65 secured to the sheet metal sides 21 of the assemblies 18 and 48. These plates are slotted as shown at 66 and 66' and are held by bolts 67 so that they can be moved upwardly or downwardly relative to the sides, the amount of movement being determined by the length of slots 66.

Spindles 68 and 68' are secured to the sides plates and extend inwardly and downwardly to support relatively small rollers 69 and 69' and these rollers engage under the side edges 70 of the upper runs of the belts 31A and 31A' thus forming them into the trough-like configuration shown in FIG. 5. This assists in retaining the material upon the belt during the operation of the device.

In operation, the mass of material consisting of the by-products from primary seed cleaning is fed into the hopper and agitated by agitator 45 and deposited in a free drop upon the upper run 31A of the upper assembly or primary endless belt assembly 18 and this hopper assembly is situated towards the lower or tail end 52 of the assembly. Due to this free drop, the heavier material in the mass bounces on the belt and moves downwardly over the tail end 52 of the assembly 18. This includes round solid seed but also some broken and flat seeds would be delivered at this point. The lighter material in the mass from the hoper is delivered over the head pulley at the upper end 59 and collected by the hood 47.

The fraction that passes over the lower or tail end 52 is dropped onto the upper run of the lower assembly 48 towards the lower or tail end 52' and once again the free drop causes a bouncing delivery action whereby the solid round seed such as rape-seed and mustard move downwardly over the tail or lower end 52' to be collected in a convenient hopper (not illustrated).

Small rape-seed and flat seeds moves upwardly on the upper run 31A' to the head end pulley at the upper end 59' and is deposited into the collector hood 47' and grades sample rape-seed whereas the tail pulley product over the lower end 52' would grade rejected rape-seed account admixture.

The fraction that passes over the head end 59 of the upper assembly 18 is a finished product known as rape screenings and can be used for animal feed.

Of importance is the angle of inclination of the assembly 18 and 48.

The assembly 18 inclines at an angle from the horizontal with the upper run 31A extending upwardly from the lower end 52 towards the upper end 59.

The assembly 48 is also at an angle from the horizontal but at a shallower angle than the assembly 18 and once again the upper run 31A' extends upwardly from the lower end 52' towards the upper end 59'.

It is important to control not only the speed of the belts but also the angle of inclination of the two assemblies 18 and 48 in order to get the efficient separation desired of the by-products of initial seed cleaning operations, so that three distinct fractions can be recovered all of which have considerable commercial value.

Various modifications may be constructed or performed within the scope of the inventive concept disclosed. Therefore what has been set forth is intended to illustrate such concept and is not for the purpose of limiting protection to any herein particularly described embodiments thereof.

We claim:

1. A seed reclaiming device for recovering rape seed and the like from the by-products resulting from initial seed cleaning operations comprising in combination a supporting structure, a primary endless belt, rollers mounting in said supporting structure supporting said belt for rotation, the upper run of said belt inclining upwardly at an angle from the horizontal, a feed hopper supported in said supporting structure above said upper run and towards the lower end thereof, a secondary endless belt, rollers mounted in said supporting structure for supporting said belt for rotation, the upper run of said belt underlying said primary endless belt, the lower end of said secondary endless belt being forwardly of the lower end of said primary endless belt whereby the seed fraction passing over said lower end of said primary endless belt is deposited onto the upper run of said secondary endless belt towards the lower end thereof, means to adjust the angles of inclination of said belts independently, and a source of power for driving said belts whereby the upper runs thereof move upwardly from the lower ends towards the upper ends thereof, said primary belt inclining at a greater angle from the horizontal than said secondary belt, and means along the side edges of said upper run of said belts to raise said side edges whereby said upper runs form a shallow trough, said means including a plurality of spaced roller engaging the underside edges of said upper run, and brackets supporting said rollers, said brackets being adjustable in height, said feed hopper including a discharge extending across said upper run, said discharge being spaced above said upper run whereby material is deposited from said discharge upon said upper run after a free drop from said discharge.

\* \* \* \* \*